June 28, 1949.  W. S. MASTER  2,474,270
SUPPORT FOR VOLTAGE REGULATORS
Filed Oct. 16, 1944  3 Sheets-Sheet 1

INVENTOR.
WARREN S. MASTER
BY
AGENT

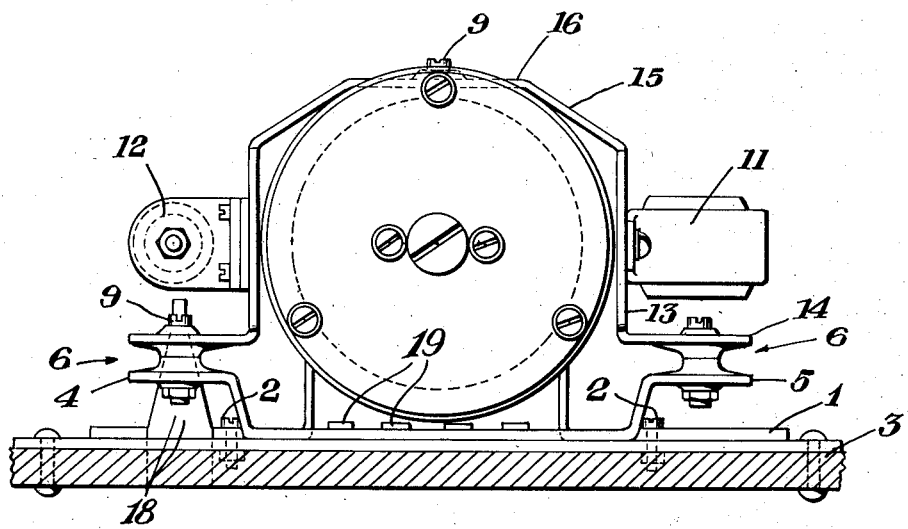
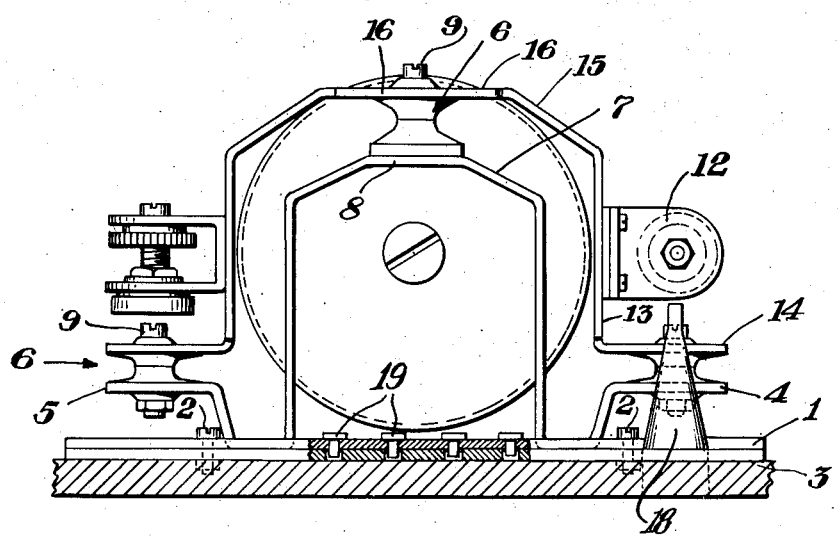

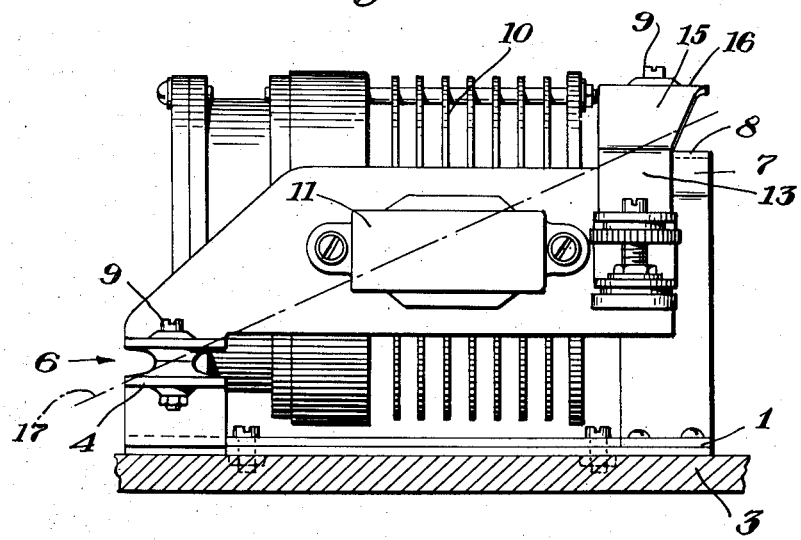
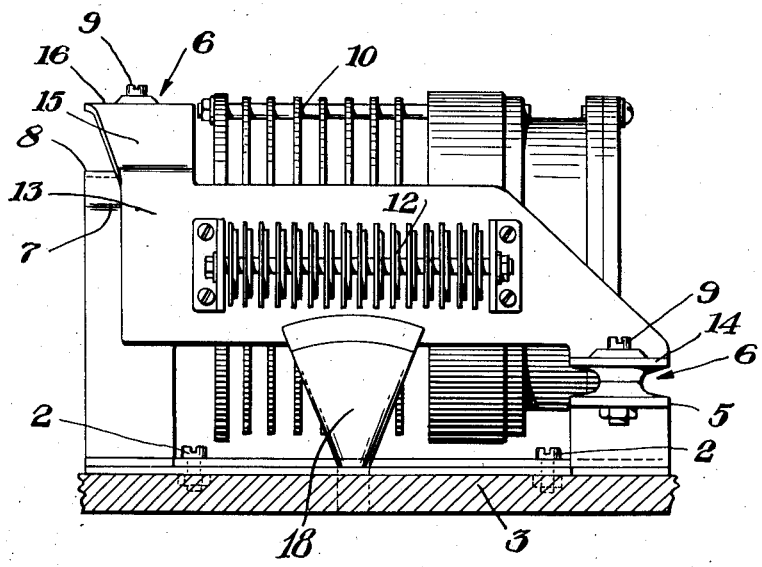
INVENTOR.
WARREN S. MASTER

Patented June 28, 1949

2,474,270

UNITED STATES PATENT OFFICE 2,474,270

SUPPORT FOR VOLTAGE REGULATORS

Warren S. Master, Rutherford, N. J., assignor to Federal Telephone and Radio Corporation, New York, N. Y., a corporation of Delaware Application October 16, 1944, Serial No. 558,926

1 Claim. (Cl. 322—100)

The present invention relates to a mounting for voltage regulator units, particularly for units to be used in airplanes, where they are exposed to forced vibration which might destroy the unit.

It has been found that airplanes develop an operating frequency under the forced vibration in the range of 10 to 55 cycles per second. In the operation of a carbon pile regulator through a rectifier the carbon pile and the rectifier are liable to destruction when exposed to the forced vibration in the range of 10 to 55 cycles per second.

It is the main object of the present invention to provide a resilient mounting for the voltage regulator unit, which mounting has a resonant frequency of less than 10 cycles per second.

It is a further object of the present invention to provide a resilient mounting for the voltage regulator unit, which has a resonant frequency of less than 10 cycles per second in any direction.

It is still another object of the present invention to provide a clip-in base which is riveted to the housing of a power source such as an inverter and is connected to the base member of the unit by easily removable means, thus rendering the unit quickly exchangeable.

A still further object of the present invention is to provide a resilient mounting for the voltage regulator unit, which mounting comprises at least three resilient units whereby the plane formed by the three resilient units runs through the center of gravity of the supported elements of the voltage regulator unit.

A still further object of the present invention is to provide a resilient mounting for voltage regulator units, which mounting comprises at least three resilient units, whereby the weight of the elements of the voltage regulator unit supported by the three resilient units is distributed equally among all resilient units.

With these and other objects in view, which will become apparent as the specification proceeds, the embodiment of my invention will be best understood by reference to the following specification and claim and the illustrations in the accompanying drawings:

Fig. 2 is a front view of the device shown in Fig. 1;

Fig. 3 is a rear view of the device shown in Fig. 1;

Fig. 4 is a side view of the voltage regulator unit seen from the transformer side, and Fig. 5 is a side view of the voltage regulator unit, seen from the rectifier side.

Figure 1:
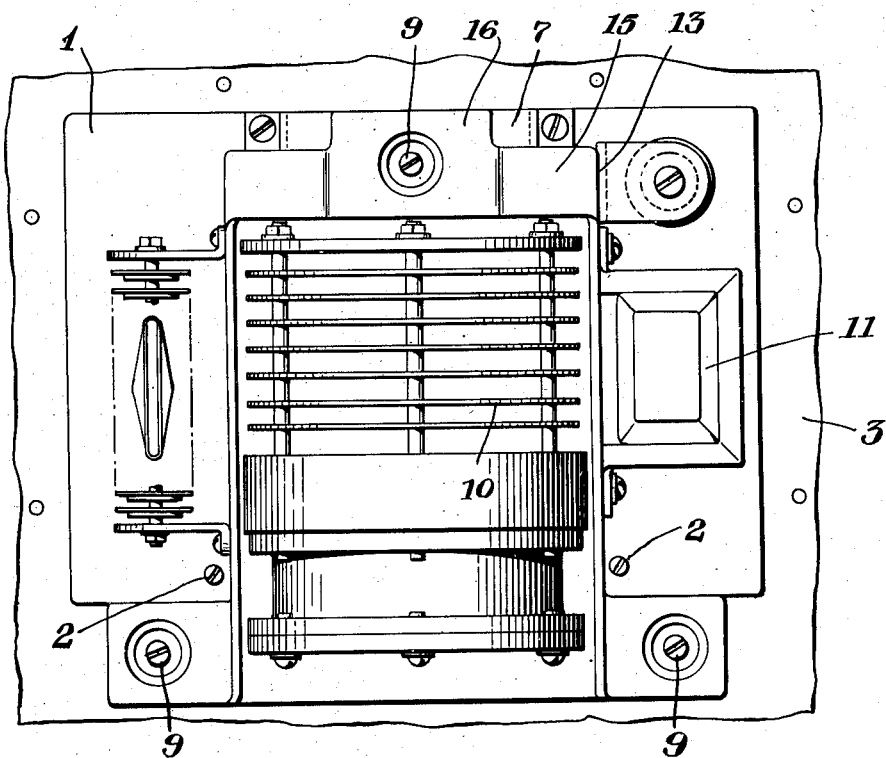
Fig. 1 is a plan view of the voltage regulator unit embodying my invention.

Referring now more specifically to the drawings, there is shown a base member 1 which is secured by screws 2 or the like easily removable connecting means to another base plate 3 riveted to the housing of the inverter or to the proper part of the airplane. The easily removable connecting means provide the possibility of replacing the entire voltage regulator unit within a very short time.

As shown particularly in Fig. 2, two corners 4 and 5 at the front of the base member 1 are bent upwards to extend parallel to the remaining part of the member 1 and are designed to receive a resilient supporting member 6. A bridge like part 7 is riveted to the back of the base member 1 extending upwards and formed with a flat top 8, which top is equipped with a hole the diameter of which corresponds to that of a member of the resilient unit 6, to be described later. The resilient supporting member 6 may be of any construction suitable for the present purpose which has a resonant frequency of less than 10 cycles per second. Preferably it consists of a known construction comprising two superposed metal plates, each receiving a rubber disc which is equipped with a central tube. A screw bolt 9 extending through both tubes provides the connection for the two rubber discs. The two rubber discs, each of which is arranged in the corresponding plate, are held together by the screw bolt 9 forming one single resilient unit. The lower metal plate of the resilient units is riveted to the top of the mentioned corners 4 and 5, respectively, and to the top 8 of the bridge like member 7 of the base member 1, which corners are provided with holes of a diameter corresponding to that of the mentioned rubber discs.

The carbon pile 10 and preferably also the transformer 11, the rectifier 12, and any other elements of the voltage regulator unit liable to destruction due to the forced vibration of the airplane are mounted on a frame 13, which consists mainly of two vertically arranged side plates which end at their front into horizontal arms 14, extending sidewards, whereas their rear ends form a bridge 15, connecting both side plates and having a flat top 16. The sidewardly extending arms 14 and the top 16 of the bridge 15 have holes similar to that of the corners 4 and 5 of the base member 1 and of a diameter corresponding to that of the rubber discs of the resilient unit. Thus three resilient units are provided for the support of the voltage regulator unit in a three-point support.

The three-point support of the regulator unit forms a plane which runs through the center of gravity of all elements of the regulator unit supported by the three resilient units. In the embodiment of the present invention the plane 17 formed by the three resilient units is arranged in an angle to the base member 1, as shown in Fig. 4. The provision of the bridge 15 of the frame 13, and the raising of the third point forming the supporting plane 17 serve mainly the purpose of adjusting and assembling the carbon pile 10 in the regulator unit and, therefore, the three resilient units can be arranged also in a horizontal plane, parallel to the base member 1, as long as this plane runs through the center of gravity of all elements of the regulator unit which are supported by the resilient units. Though it is of advantage to provide the resilient support for the carbon pile as well as for the rectifier, the transformer, and all other elements, it might be sufficient to limit the resilient support for the carbon pile which is most liable to destruction under the strain of the forced vibrations of the airplane.

A duct 18 is provided below the rectifier and fixed to the base member 1 which has an opening corresponding to the open space of the duct 18 which is adapted to provide cooling air for the rectifier. The opening in the base member 1 is continued into an opening of the base plate and further into the housing of the inverter in order to assure the air supply from the usual blower (not shown) in this inverter. Spring contacts 19 are carried by and project beneath said base member 1.

As stated before, it has been found that airplanes develop an operation frequency of 10 up to 55 cycles per second forced vibration and, therefore, the resonant frequency of each of the used resilient units must be less than 10 cycles per second. This arrangement brings about the result that whereas the base plate 3 riveted to the airplane and the base member 1 screwed to the base plate 3 follow all forced vibrations of the plane, the elements of the voltage regulator unit which are supported by the resilient units do not follow these forced vibrations of the plane, but stand still.

It has been found to further advantage to distribute the weight of the resilient supporting elements of the regulator unit equally among all three supporting units, so that each of the units carries the same weight, which provides a benefit of not only achieving the proper resilient support against vibrations in vertical direction, but in any direction, which is of utmost importance for resilient supports in airplanes. Thus any resilient unit having a resonant frequency of less than 10 cycles per second in any direction can be used in connection with the present invention.

While I have disclosed the principles of my invention in connection with several different embodiments, it will be understood that these embodiments are given by way of example only and not as limiting the scope of the invention as set forth in the objects and the appended claim.

What I claim is:

In combination, a controllable power source having a housing, and a voltage regulator unit therefor adapted to be removably attached to said housing, said voltage regulator unit including a base member, a frame resiliently supported on said base member, resilient units of a resonant frequency of less than 10 cycles per second for support of said frame, and electrical components including a rectifier carried by said frame, spring contacts carried by and projecting beneath said base member, corresponding contact members carried by said housing and cooperating with said projecting contacts to electrically interconnect said voltage regulator unit with said power source when said voltage regulator unit is attached to the housing, said housing and said base member having connecting openings positioned beneath said rectifier, and a duct carried by the said base member adjacent to the said rectifier and arranged above an opening of the latter, whereby cooling air expelled from the inside of said housing is directed through said opening, into the said duct and against said rectifier, and means for removably attaching said base to the said housing.

WARREN S. MASTER.

REFERENCES CITED

The following references are of record in the file of this patent:

UNITED STATES PATENTS

| Number | Name | Date |
| --- | --- | --- |
| 1,685,778 | Heideman | Oct. 2, 1928 |
| 2,052,078 | Brown | Aug. 25, 1936 |
| 2,155,377 | Troff | Apr. 18, 1939 |
| 2,171,512 | Grout | Aug. 29, 1939 |
| 2,198,672 | Lee | Apr. 30, 1940 |
| 2,305,206 | Strobel | Dec. 15, 1942 |
| 2,313,974 | Smith | Mar. 16, 1943 |

OTHER REFERENCES

General Electric Review, February 1935, pages 77–83.